US011998116B2

(12) United States Patent
Aramli

(10) Patent No.: US 11,998,116 B2
(45) Date of Patent: Jun. 4, 2024

(54) MATTRESS CORNER RETAINER BRACKET

(71) Applicant: BEDJET LLC, Newport, RI (US)

(72) Inventor: Mark Darius Aramli, Newport, RI (US)

(73) Assignee: BEDJET LLC, Newport, RI (US)

( * ) Notice: Subject to any disclaimer, the term of this patent is extended or adjusted under 35 U.S.C. 154(b) by 281 days.

(21) Appl. No.: 17/744,910

(22) Filed: May 16, 2022

(65) Prior Publication Data

US 2023/0363546 A1 Nov. 16, 2023

(51) Int. Cl.

*A47C 21/02* (2006.01)
*A47C 20/04* (2006.01)
*A47C 21/00* (2006.01)
*A61G 7/015* (2006.01)

(52) U.S. Cl.

CPC ............ *A47C 21/026* (2013.01); *A47C 20/04* (2013.01); *A47C 21/00* (2013.01); *A61G 7/015* (2013.01)

(58) Field of Classification Search

CPC ..... A47C 21/026; A47C 21/00; A47C 20/041; A47C 20/04; A47C 21/02; A47C 21/06; A47C 31/00; A47C 21/08; A47C 19/045; A47C 19/122; A47C 19/02; A61G 7/015; A61G 13/08

USPC .................................... 5/658, 411, 193, 425

See application file for complete search history.

(56) References Cited

U.S. PATENT DOCUMENTS

2014/0325761 A1* 11/2014 Rawls-Meehan .... A47C 19/025 5/617
2015/0359346 A1* 12/2015 Scarleski .............. A47C 21/00 5/658

OTHER PUBLICATIONS

"Two Corner Retainer Bar Kit." Reverie Sleep Systems, Jan. 20, 2022, www.reverie.com/parts/MA-RB-KIT-152.html (Year: 2022).*

* cited by examiner

*Primary Examiner* — David R Hare
*Assistant Examiner* — Madison Emanski
(74) *Attorney, Agent, or Firm* — Robert J. Hess; Hess Patent Law Fim

(57) ABSTRACT

A mattress corner retainer bracket having a flex segment pivotally mounted to an adjustable bed frame and having two retention segments spaced apart that are each joined to the flex segment. Each of the three segments extend in different respective planes relative to each other. As a mattress flexes in unison with adjustable movement imparted by the adjustable bed frame, the mattress corners impart a force against the two retention segments, which retain the mattress in its relative position on the adjustable bed frame by preventing the mattress from sliding off. The two retention segments are joined to each other via a joining rod that extends within the flex plane.

15 Claims, 15 Drawing Sheets

MATTRESS CORNER RETAINER BRACKET

CROSS-REFERENCE TO RELATED APPLICATIONS

Not applicable.

STATEMENT REGARDING FEDERALLY SPONSORED RESEARCH OR DEVELOPMENT

Not applicable.

THE NAMES OF THE PARTIES TO A JOINT RESEARCH AGREEMENT

Not applicable.

REFERENCE TO A "SEQUENCE LISTING," A TABLE, OR A COMPUTER PROGRAM LISTING APPENDIX SUBMITTED ON A COMPACT DISC AND AN INCORPORATION-BY-REFERENCE

Not applicable.

BACKGROUND OF THE INVENTION

1. Field of Endeavor to which the Invention Pertains

The invention pertains to a retainer bar or retention bracket that prevents a mattress from slipping off an adjustable bed mechanism underneath while the mattress flexes in response to forces imparted by the adjustable bed mechanism that pivots to selectively raise and lower the head and foot regions of the mattress. Such a retainer bar or retention bracket is mounted to the adjustable bed frame and four may be provided adjacent each corner of the mattress.

2. Description of Information Known to the Inventor, Including References to Specific Documents Related to the Invention, and Specific Problems Involved in the State of Technology that the Invention is Drawn Toward The present inventor invented the adjustable power bed layer of U.S. Pat. No. 10,463,163 B1, whose contents are incorporated herein by reference, and the adjustable bed lift mechanism of U.S. Pat. No. 10,376,074 B2, whose contents are incorporated herein by reference. There are also other adjustable bed lift mechanisms that are conventional.

There are conventional mattress retainer bars or mattress retaining brackets. For instance, U.S. Pat. No. 9,044,365 B2 describes a conventional mattress retaining bracket and provides in part:

> The mattress retaining bracket may be secured on one end to a first side of the mattress platform and on the other end to a second side of the mattress platform. The plurality of mattress retaining brackets may be secured on diagonally opposite corners of the mattress platform. The plurality of mattress retaining brackets may be secured on both corners of a single side of the mattress platform. The plurality of mattress retaining brackets may be secured on each corner of the mattress platform. When shipping the adjustable bed frame assembly, the plurality of mattress retaining brackets are first secured to the mattress platform in a shipment orientation and may then be re-secured in a mattress securing orientation.

The present inventor contends that the presence of the mattress corner retainer bars or the mattress retaining brackets secured at the outer periphery of the mattress platform makes it cumbersome to place a fitted bed sheet onto the mattress. It is therefore desired to secure the mattress corner retainer bracket to the adjustable bed frame at a location away from the periphery of the adjustable bed frame to prevent the mattress corner retainer bracket from becoming an obstacle to placement of the fitted bed sheet onto the mattress.

SUMMARY OF THE INVENTION

One aspect of the invention resides an apparatus suited to prevent a mattress from slipping off an adjustable bed frame while the mattress flexes in unison with adjustment movements imparted by the adjustable bed frame. Such an apparatus is positioned to allow for placement of a fitted bed sheet onto a mattress without being an obstacle to such placement.

Another aspect resides in the apparatus including the mattress corner retainer bracket having a flex segment, two retaining segments and a joining segment that joins the two retaining segments to each other. The flex segment possesses a spring bias and extends from each of the two retaining segments. With a pair of mounting blocks secured to an adjustable bed frame and each of the mounting blocks having a cavity, end regions of the flex segment can be fit into the cavities and are retained there under the spring bias. The flex segment can be pivoted at the cavities.

The mattress corner retainer bracket is secured inward from the peripheral edge of the adjustable bed frame. In that manner, a fitted bed sheet can fit over both the mattress corner retainer bracket and the corner of the mattress, because the flex segment can be pivoted at the cavities to cause the mattress corner and the mattress corner retainer bracket to raise together off the adjustable bed frame and thereby leave a gap underneath. The fitted bed sheet can be inserted into that gap for its placement under the corner of the mattress because the fitted bed sheet will be covering the mattress corner retainer bracket to reach the gap.

If the corner mattress retaining bracket were instead fastened to the peripheral edge of the adjustable bed frame underneath, then the fitted sheet could not be fit over it to effect placement of the fitted bed sheet underneath the corner of the mattress. Instead, the corner of the mattress would need to be lifted to a height that clears the height of the mattress corner retainer bracket to provide access for simultaneously fitting the fitted bed sheet underneath the corner of the mattress and then dropping the corner of the mattress back onto the adjustable bed frame. Such is more cumbersome to complete than merely pivoting the corner mattress retaining bracket upward and placing the fitted bed sheet in position underneath via the gap that forms between the underside of the corner of the mattress and the topside of the adjustable bed frame because of the pivoting.

BRIEF DESCRIPTION OF THE DRAWING

For a better understanding of the present invention, reference is made to the following description and accompanying drawings, while the scope of the invention is set forth in the appended claims.

DETAILED DESCRIPTION OF THE INVENTION

Figure 1:
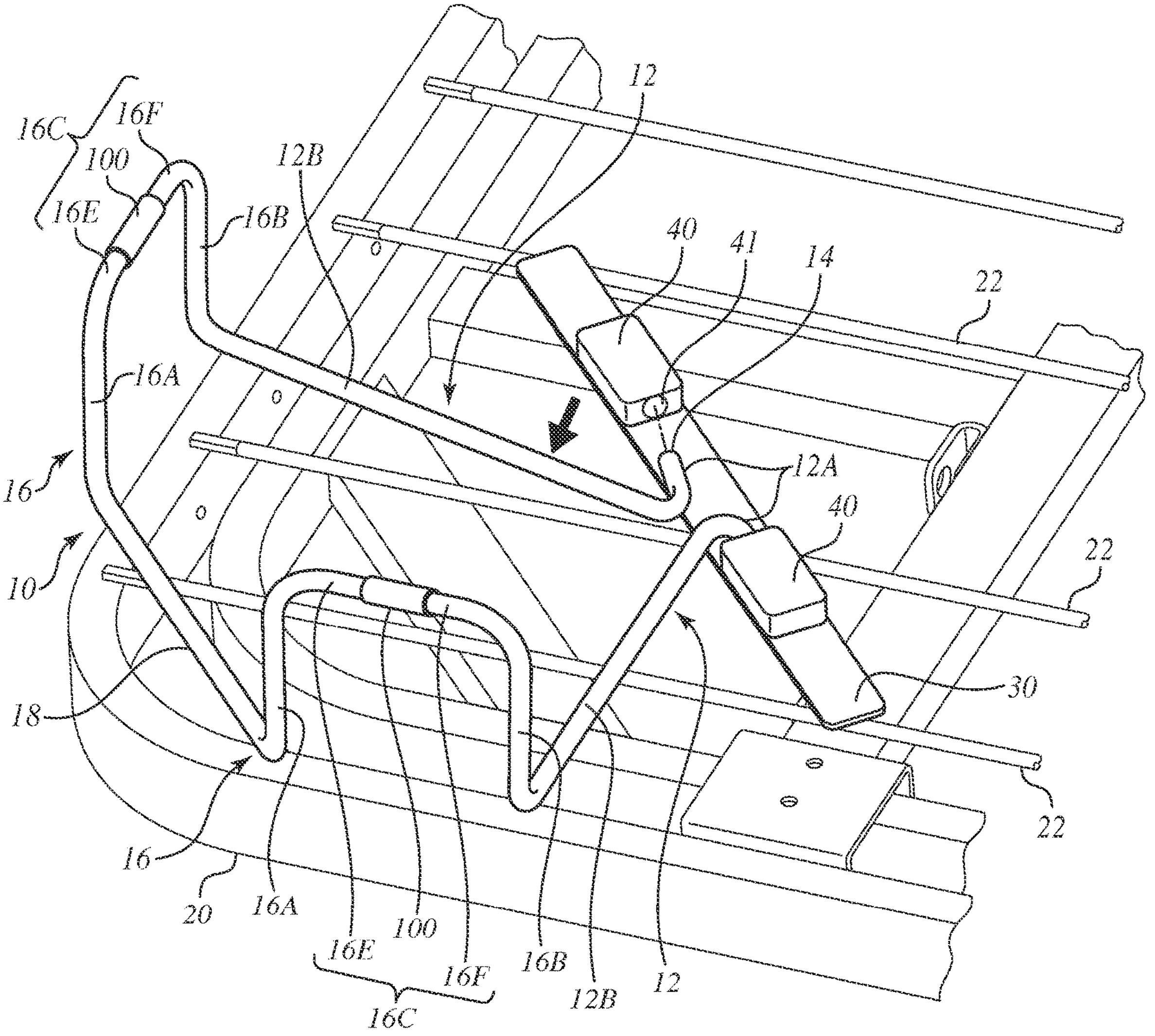
FIG. 1 is an isometric partial view of a multi-piece embodiment of a corner retainer bracket of the invention that is in the process of being secured to mounting blocks, which are attached to a mounting strip that secured to an adjustable bed frame.
Figure 2:
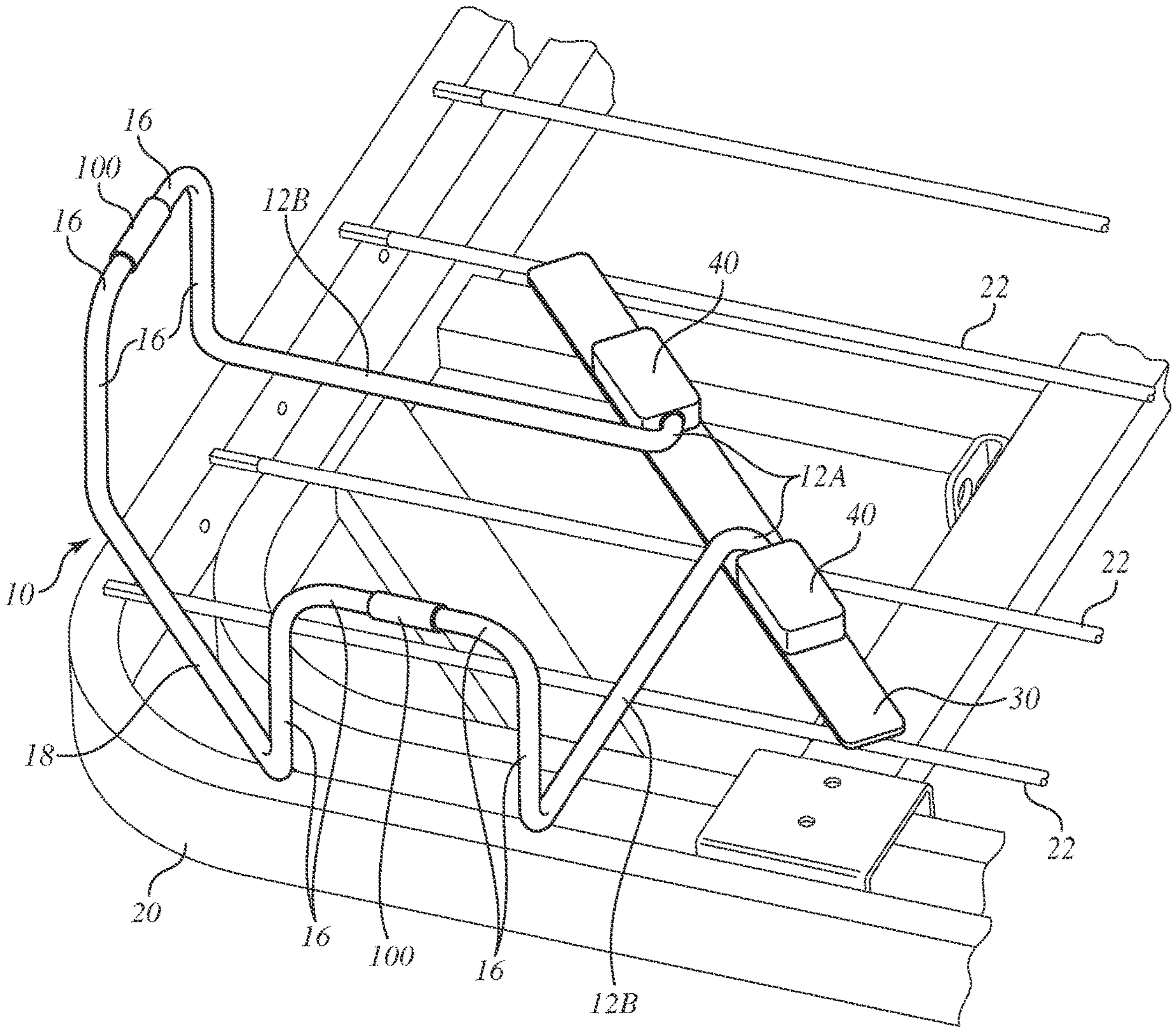
FIG. 2 is an isometric partial view of the multi-piece embodiment of the corner retainer bracket of FIG. 1 after being fully secured to the mounting blocks of FIG. 1.
Figure 9:
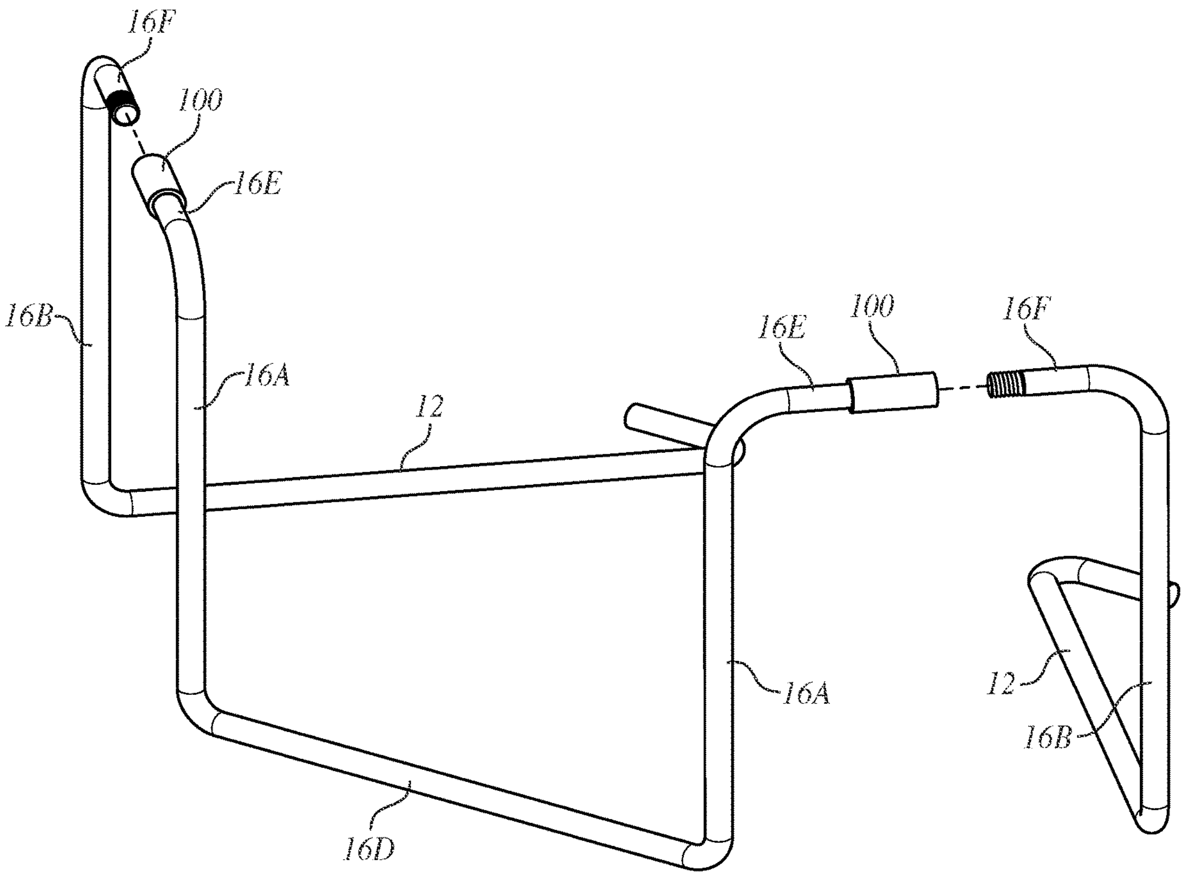
FIG. 9 is an isometric view of the corner retainer bracket prior to being fully assembled.

Turning to the drawings, FIGS. 1-2 show, in sequence, the manner of securing a corner retainer bracket 10 or retainer bar. Such is in accordance with a multi-piece embodiment of the invention (see FIG. 9). The corner retainer bracket 10 of FIGS. 1-2 is secured to mounting blocks 40, which in turn are attached to a mounting strip 30 of FIG. 3 that is welded to a rod 22 of an adjustable bed frame 20.

Figure 8:
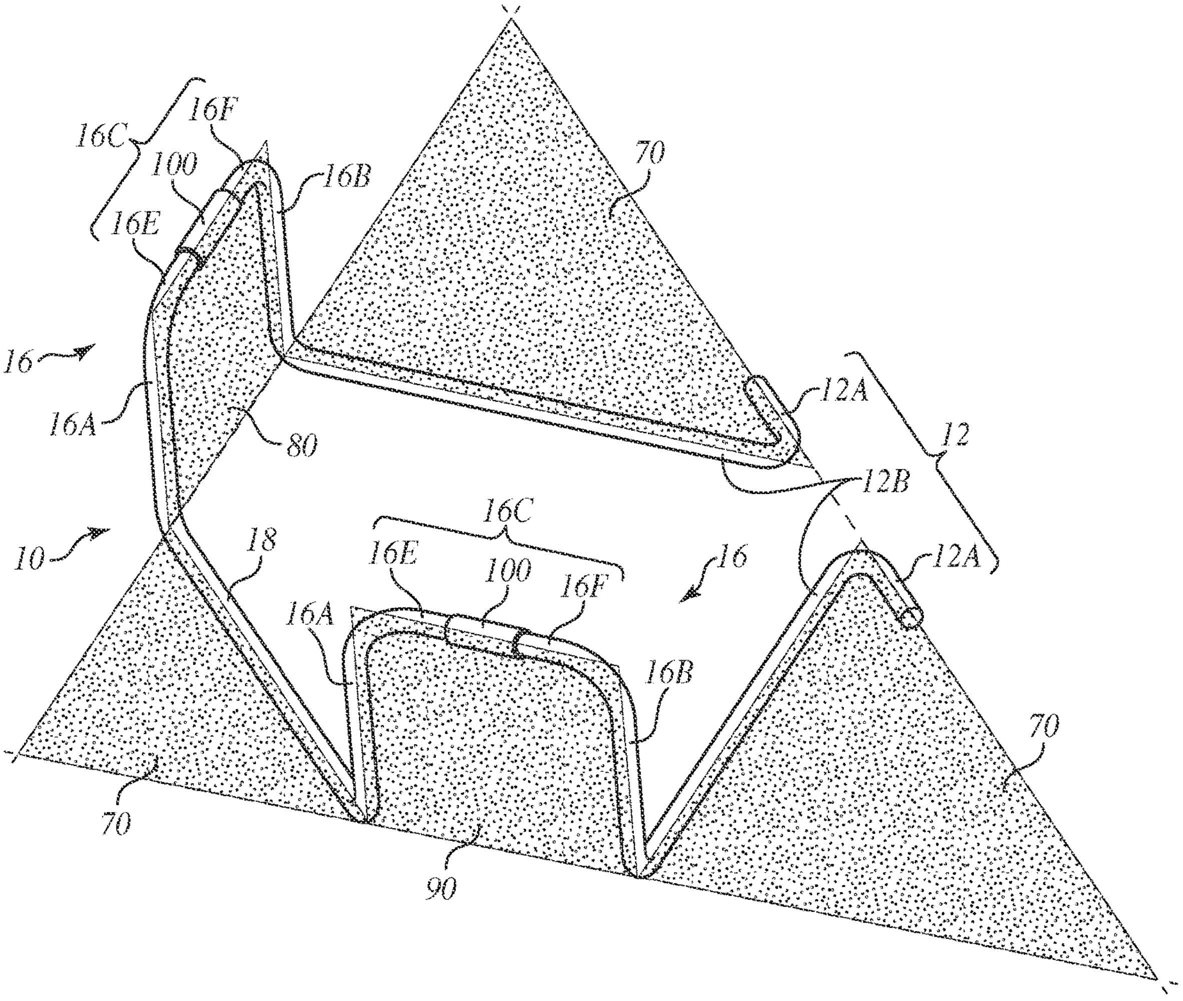
FIG. 8 is an isometric view of the corner retainer bracket and showing planes that pass through each of three segments of the corner retainer bracket.

FIGS. 4-7 show in sequence the manner of placing a fitted sheet 60 onto a corner of a mattress 50, i.e., by covering the outer facing surface of the corner retainer bracket 10. FIG. 8 shows the corner retainer bracket 10, whose flex segment 12 and separation segment 18 lie in a common flex plane 70 and whose retention segments 16 lie in respective retention planes 80, 90. The planes 70, 80, 90 intersect each other. The planes 70, 80, 90 may be perpendicular to each other. Otherwise, one or both of the planes 80, 90 may be obliquely angled relative to the plane 70. Either way, planes 70, 80 and 90 are nonparallel with respect to each other.

Turning to FIGS. 1-3 and 8, the flex segment 12 has two L-shape structures each having a foot 12A and a leg 12B. The two legs 12B converge from respective ones of the two retention segments 16 to the two feet 12A, which flare outward in opposite directions from each other to terminate at respective free ends 14.

The two retention segments 16 each have symmetric, inverted U-shape structures that each have two risers 16A, 16B and an inverted trough 16C that joins the risers 16A, 16B via respective right angle curved bends. The trough 16C has two parts 16D, 16E that are joined to each other by screw threading their exterior screw threads at their end regions with complementary, interior screw threads of a hollow sleeve 100 in a secure manner. The two parts 16D, 16E may be configured to be symmetric with each other.

The separation segment 18 is preferably linear, but could be curved instead, and joins with the riser 16A of each of the two retention segments 16 via respective right angle curved bends.

The legs 12B of each of the two L-shape structures extend from the riser 16B of each of the two retention segments 16 via respective right angle curved bends. The inverted trough 16C of each of the retention segments 16 is at a higher elevation than that of the flex segment 12, although the separation segment 18 may be at the same elevation as that of the flex segment 12.

Figure 10:
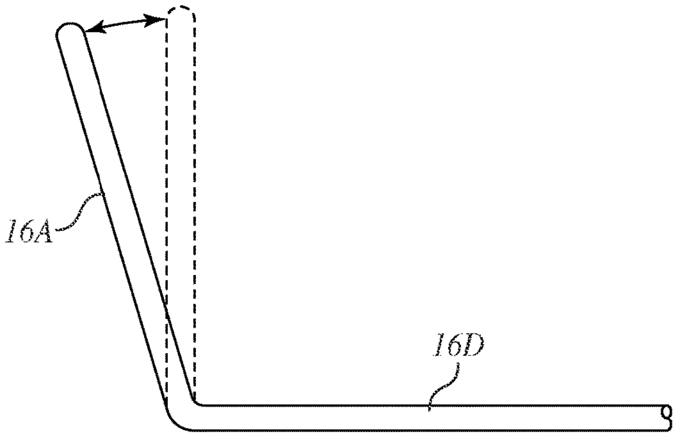
FIG. 10 is an isometric view of the corner retainer bracket of a further embodiment showing its oblique angular inclination relative to the FIGS. 8-9 perpendicular orientation (represented in FIG. 10 by broken lines).

The two risers 16A, 16B of each respective pair of the retention segments 16 are shown extending parallel to each other, although one or both of the respective pairs could extend angled obliquely instead in the manner of FIG. 10. The two legs 12B of the flex segment 12 extend from respective ones of the risers 16B of each of the retention segments 16 while the joining segment 18 extends from the risers 16A of each of the retention segments 16.

Turning to FIGS. 1 and 2, both sets of the elongated regions 12B are shown, but only one set of the end regions 12A is visible. The other end region 12A is inserted into a cavity of a mounting block 40. That cavity is the same as the cavity 41 that is shown in the other mounting block 40 and both are in alignment with each other. FIG. 8 shows both sets fully.

The insertion of the two feet 12A of the flex segment 12 into the two cavities 41 of the mounting blocks 40 may be accomplished by performing the following steps in sequence: (1) initially position one of the feet 12A into one of the cavities 41, (2) squeeze the legs 12B together under manual force which brings the feet 12A closer together as well, (3) align the remaining one of the feet 12A with the remaining one of the cavities 41, and (4) release the manual force to allow spring memory of the flex segment 12 to urge, under spring force, the remaining one of the feet 12A to enter the aligned one of the remaining cavities 41. The flex segment 12 is thereby mounted to the mounting blocks 40 and may pivot at the cavities 41.

Figure 3:
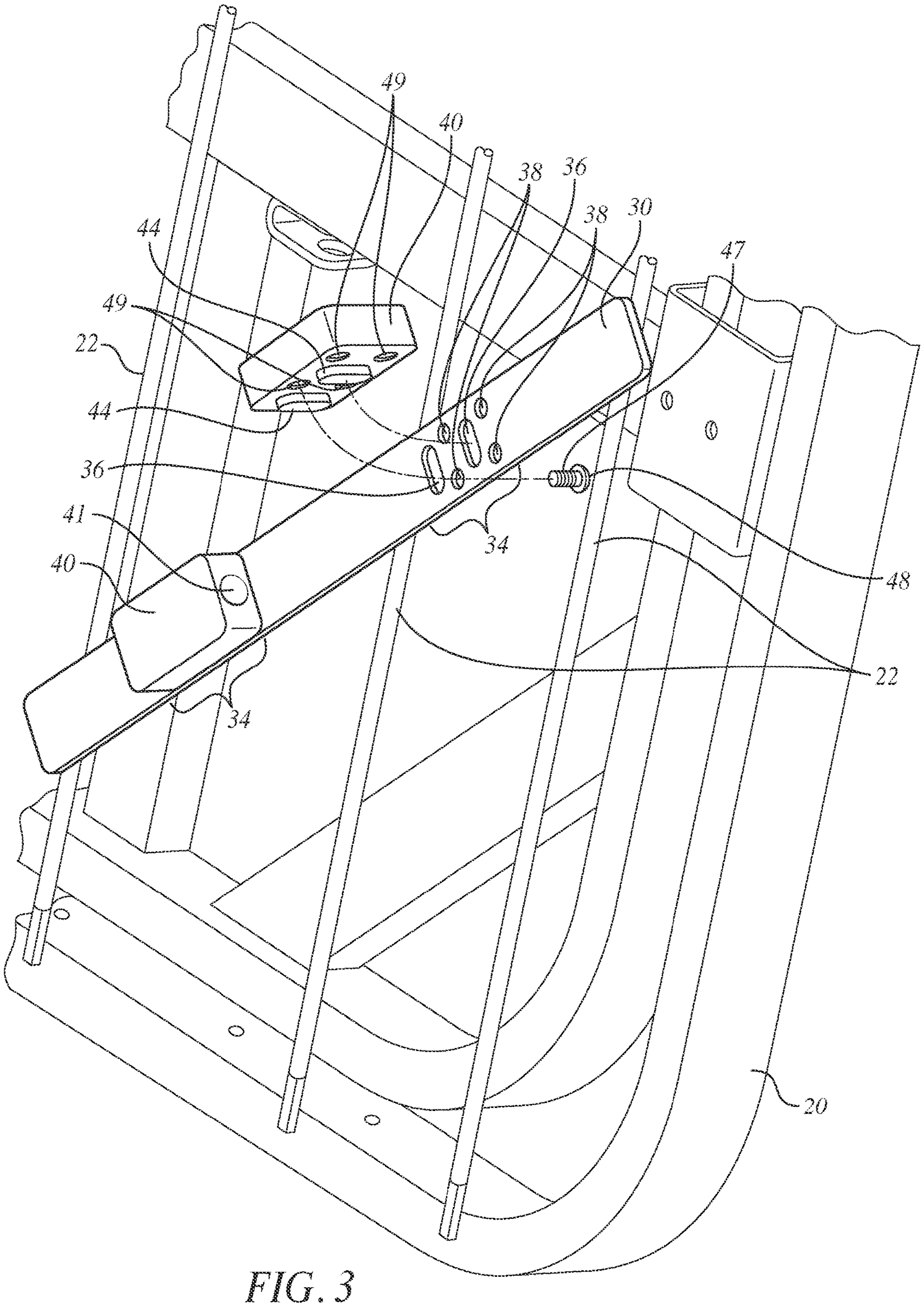
FIG. 3 is an isometric view of the mounting strip of FIGS. 1 and 2 welded to rods of the adjustable bed frame, with one of the mounting blocks secured to the mounting strip and with another of the mounting blocks shown prior to being mounted to the mounting strip.
Figure 4:
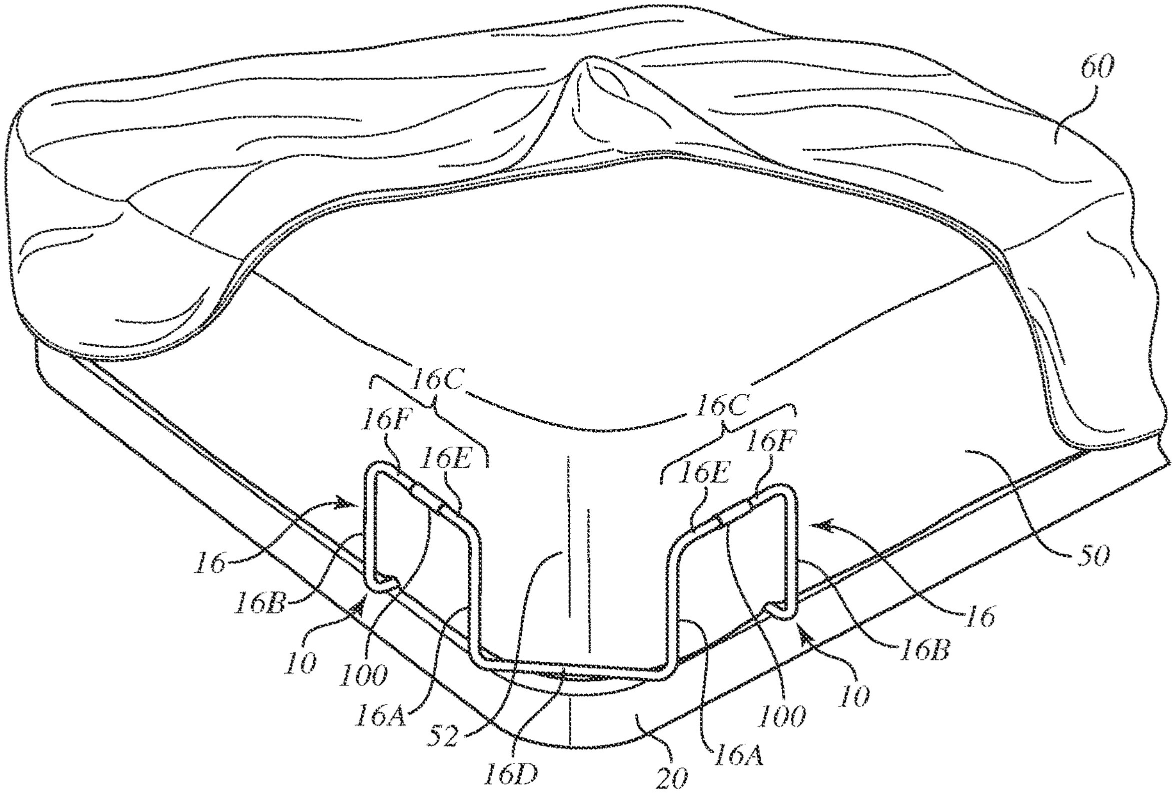
FIG. 4 is an isometric corner view of the adjustable bed frame equipped with the corner retainer bracket of FIGS. 1-3, but with a mattress placed in position and with a fitted bed sheet upon the mattress prior to fitting the fitted bed sheet over the corner retainer bracket to cover the corner of the mattress.
Figure 5:
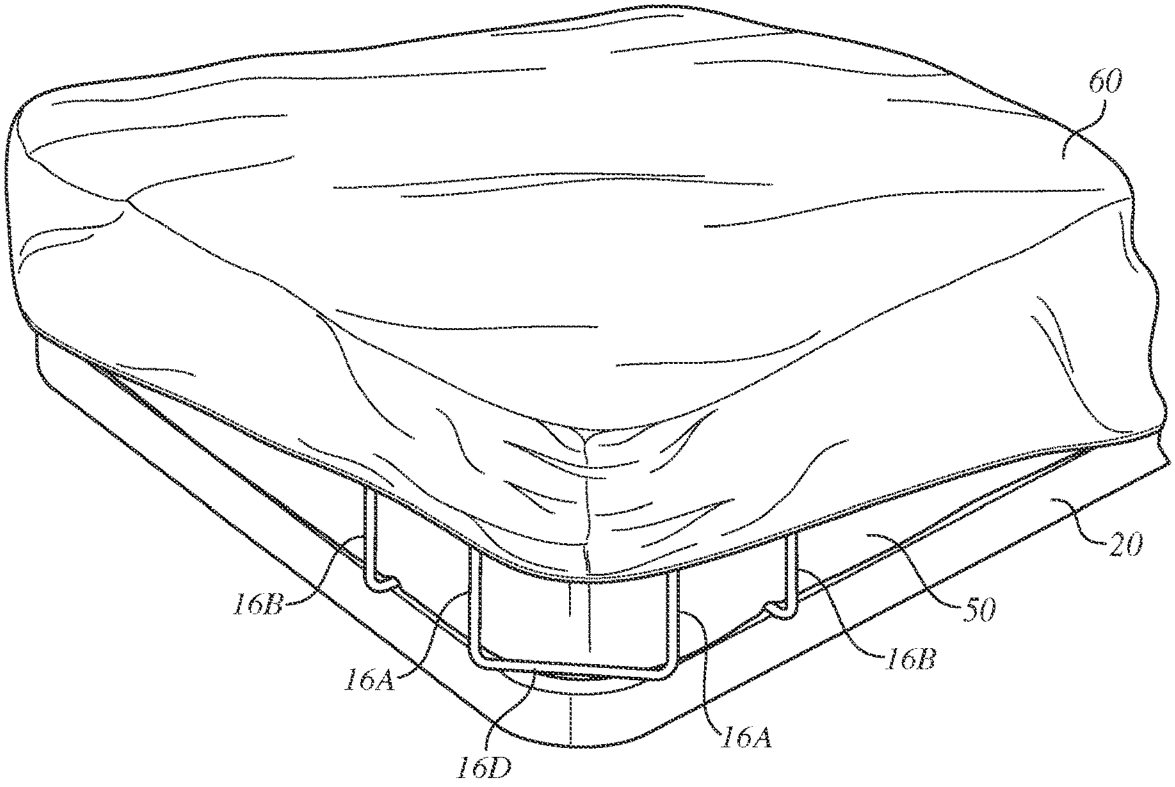
FIG. 5 is an isometric view as in FIG. 4 but showing the fitted bed sheet pulled partially over the corner retainer bracket.
Figure 6:
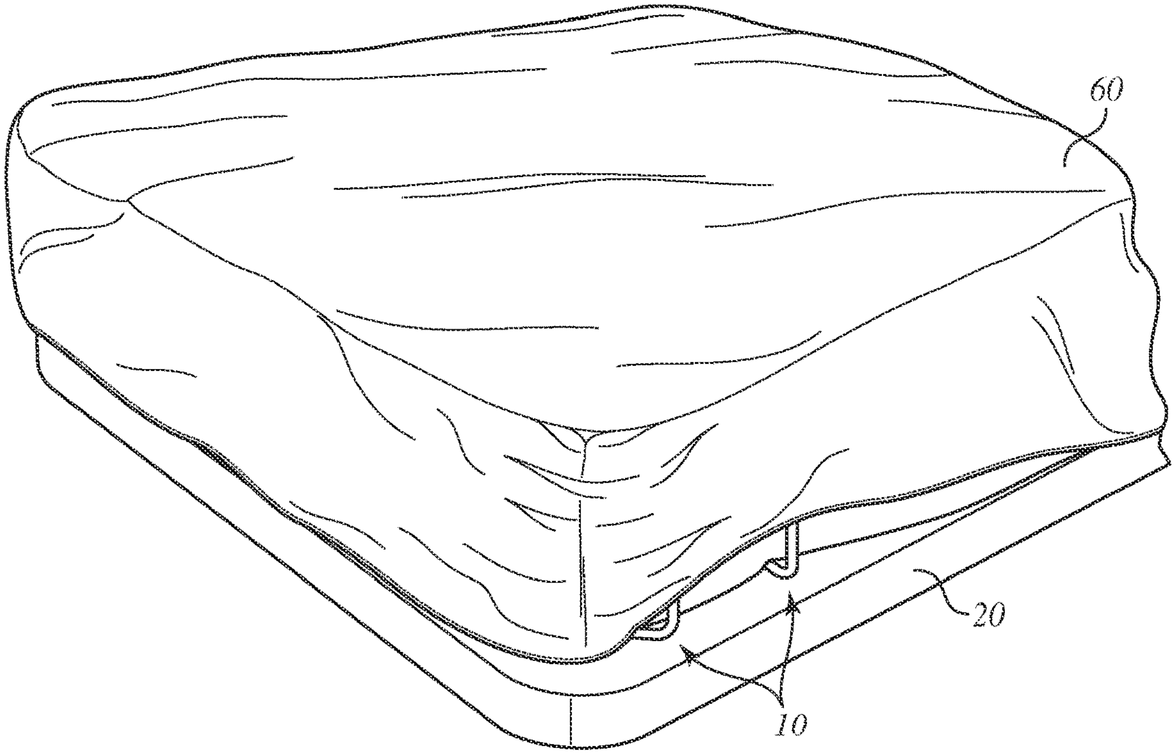
FIG. 6 is an isometric view as in FIG. 5 but with the corner of the mattress and the corner retainer bracket raised off the adjustable bed frame to leave a space that enables insertion of a corner edge of the fitted bed sheet into the space.
Figure 7:
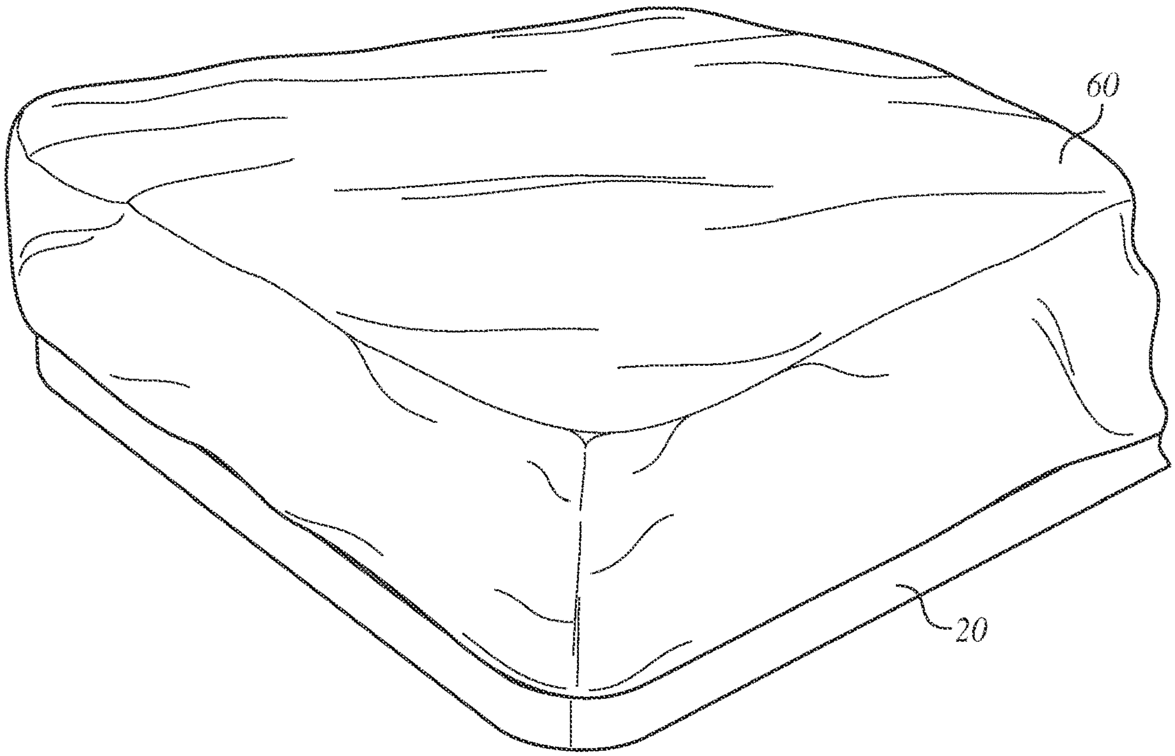
FIG. 7 is an isometric view as in FIG. 6 after the corner edge of the fitted bed sheet is in position under the mattress and the corner retainer bracket, which has been lowered back onto the adjustable bed frame.

As shown in FIG. 3, the mounting strip 30 has a pair of spaced apart regions 34. Each of the spaced apart regions 34 has a symmetric arrangement of holes, but only one arrangement of holes is shown. That is, the arrangement includes a pair of elongated holes 36 with an associated pair of round holes 38 as shown for one of the spaced apart regions 34. A pair of mounting blocks 40 are mounted onto the regions 34 by inserting a respective pair of projections 44 into an associated pair of the elongated holes 36 and then inserting the threaded stems 47 of four conventional screws 48 (only one screw 48 shown for the sake of brevity) through associated ones of the round holes 38 that are in alignment with complementary threaded openings 49 in the mounting blocks 40 so that the threaded stems 47 of the four screws 44 may be securely screwed in place.

In that manner, the mounting blocks 40 are securely fastened to the adjustable bed frame 20 via the mounting strip 30. In accordance with conventional practice, the screw 44 is screwed into a secured position with the applicable one of the mounting blocks 40 by turning the screw 44 in a clockwise direction about its axis and can be unscrewed from the complementary threaded openings 49 by turning the screw 44 counterclockwise.

As can be appreciated from FIGS. 4-7, after the corner retainer bracket 10 is secured to the adjustable bed frame 20 in accord with FIGS. 1-3, the fitted bed sheet 60 can be fitted under a corner of the mattress 50 to covering the outer facing surface of the corner retainer bracket 10 in its entirety with the fitted bed sheet 60 and then pivoting upward the flex segment 12 at the cavities 41 in the mounting blocks 40 to form a gap between an underside of the corner of the mattress 50 and a topside of the adjustable bed frame 20. An edge region of the fitted bed sheet 60 may then be inserted into the gap and placed against an underside of the corner of the mattress and then the mattress corner retainer bracket 10 may be pivoted down to close the gap.

During adjustable motion of the adjustable bed frame 20, the retention segment 16 retains a corner 52 of a mattress 50 in a relative position with respect to the adjustable bed frame 20 as the mattress 50 flexes in unison with corresponding movement of the adjustable bed frame 20, even though the corner of the mattress 50 imparts forces against the retention segments 16.

Figure 11:
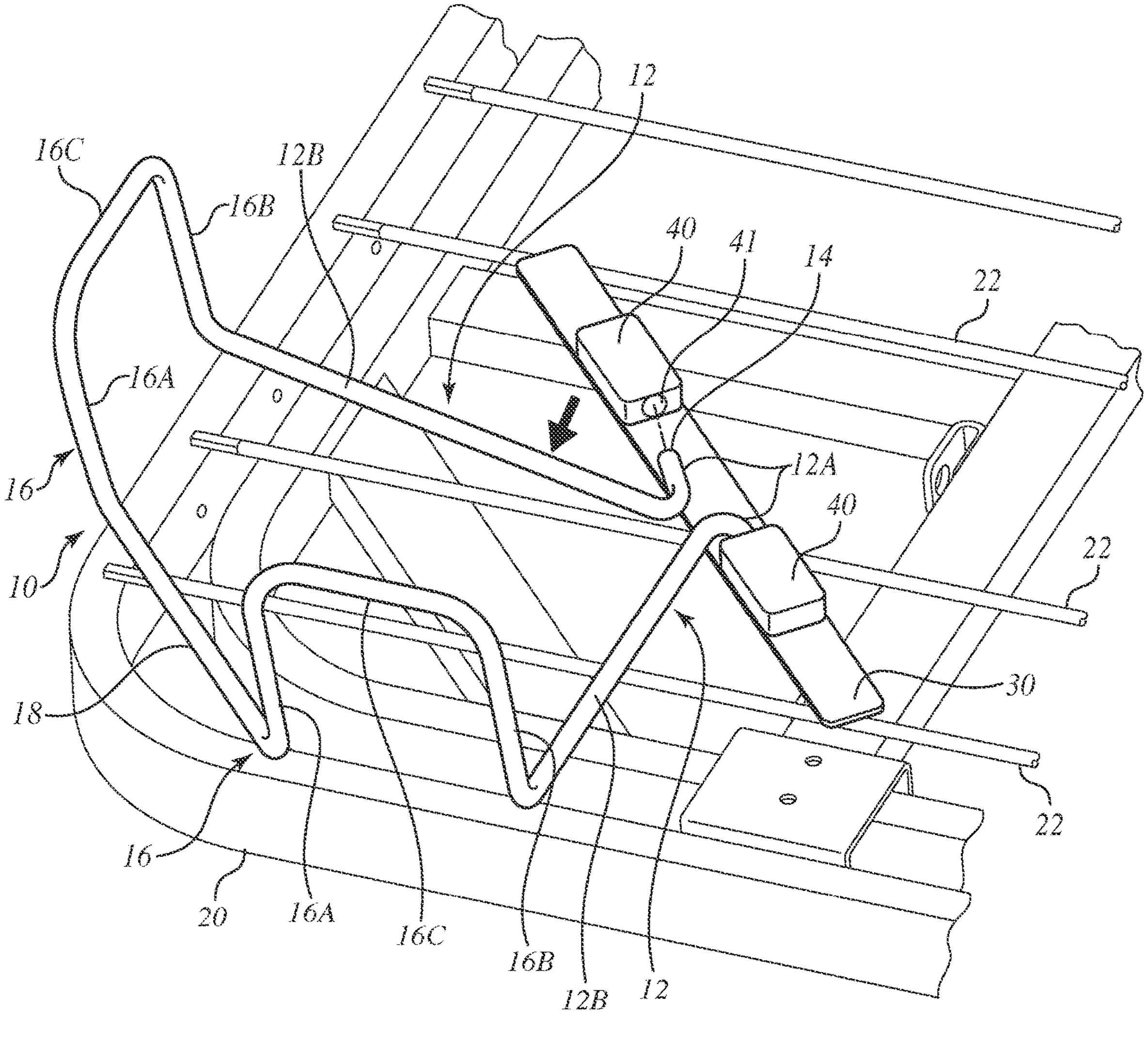
FIGS. 11-12, which correspond to the views of FIGS. 1-2, expect that they depict an obliquely angled, single-piece embodiment of the corner retainer bracket instead of the multi-piece embodiment of FIGS. 1-2.
Figure 12:
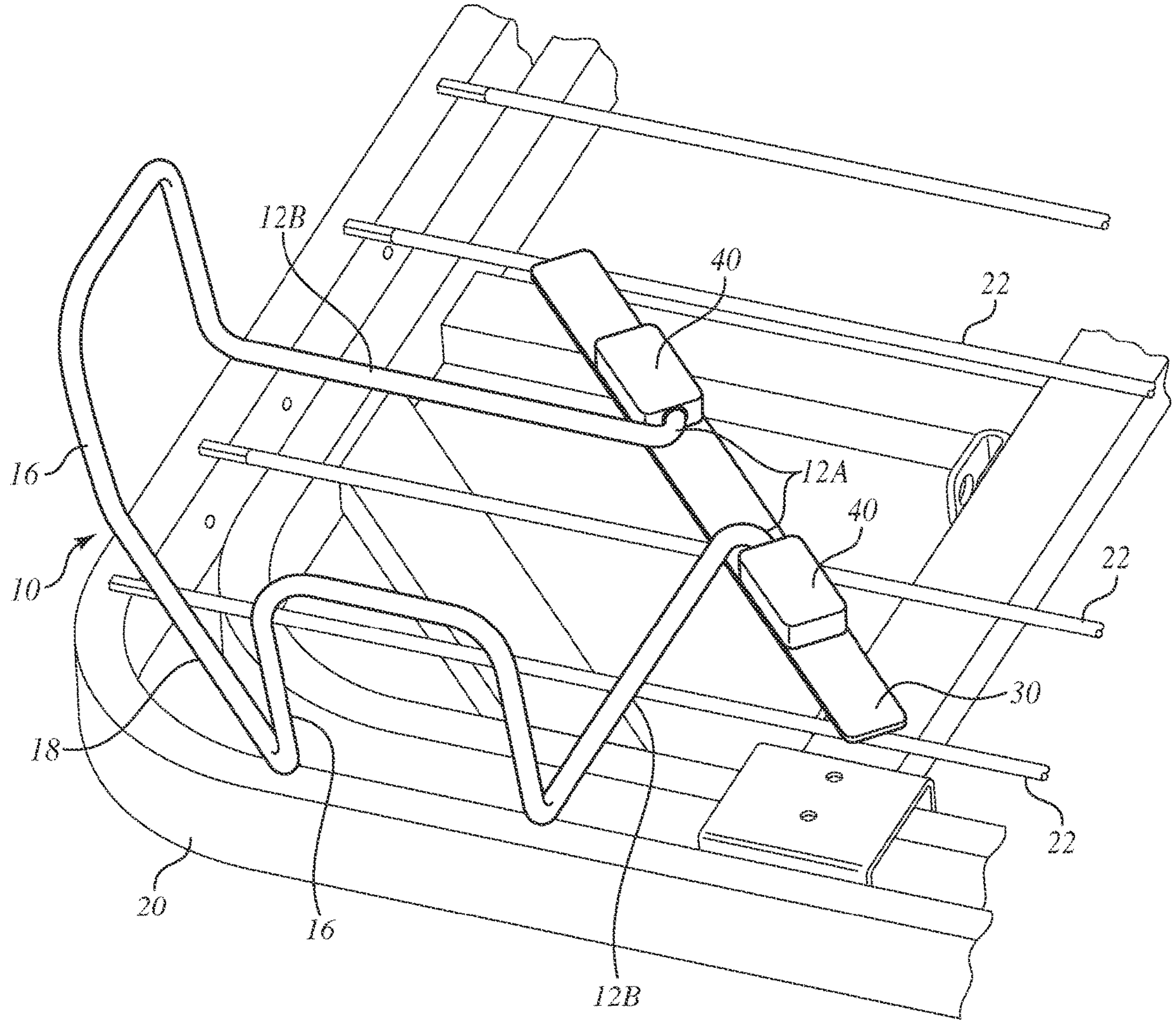
Figure 13:
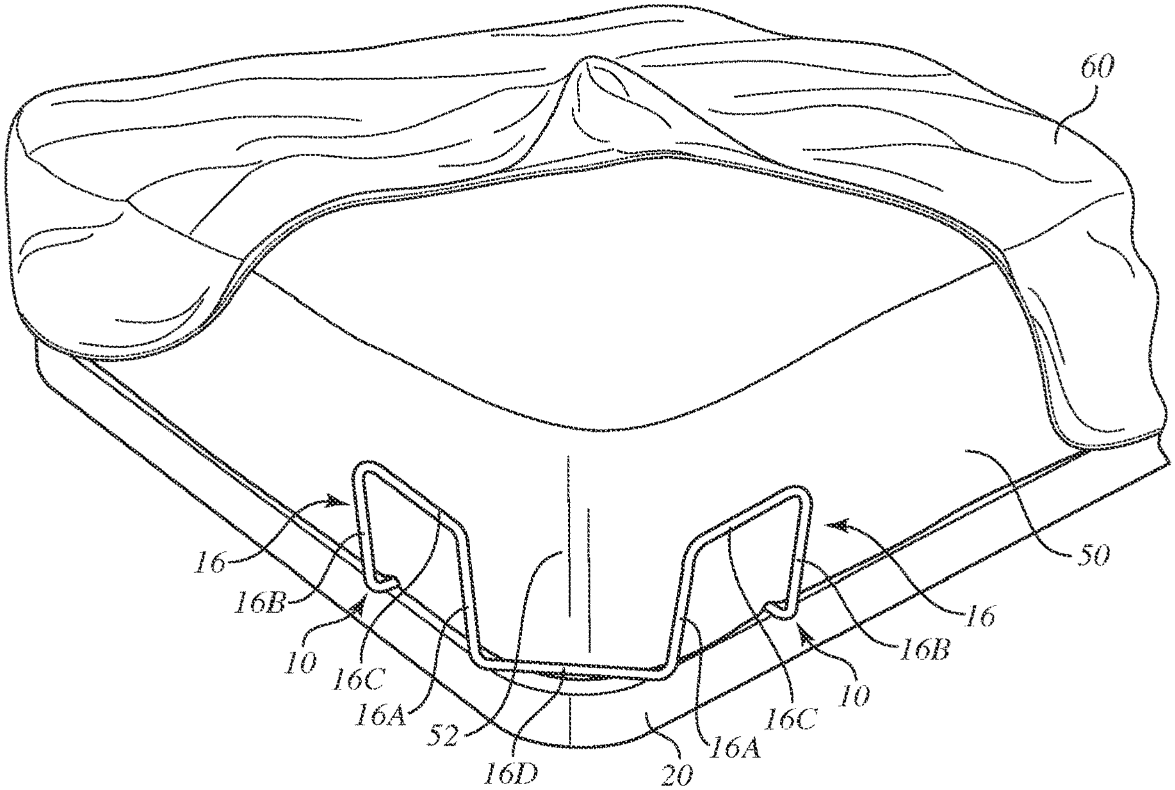
FIGS. 13-14, which correspond to the views of FIGS. 4-5, expect they depict the obliquely angled, single-piece embodiment of the corner retainer bracket of FIGS. 11-12 instead of the multi-piece embodiment of FIGS. 4-5.
Figure 14:
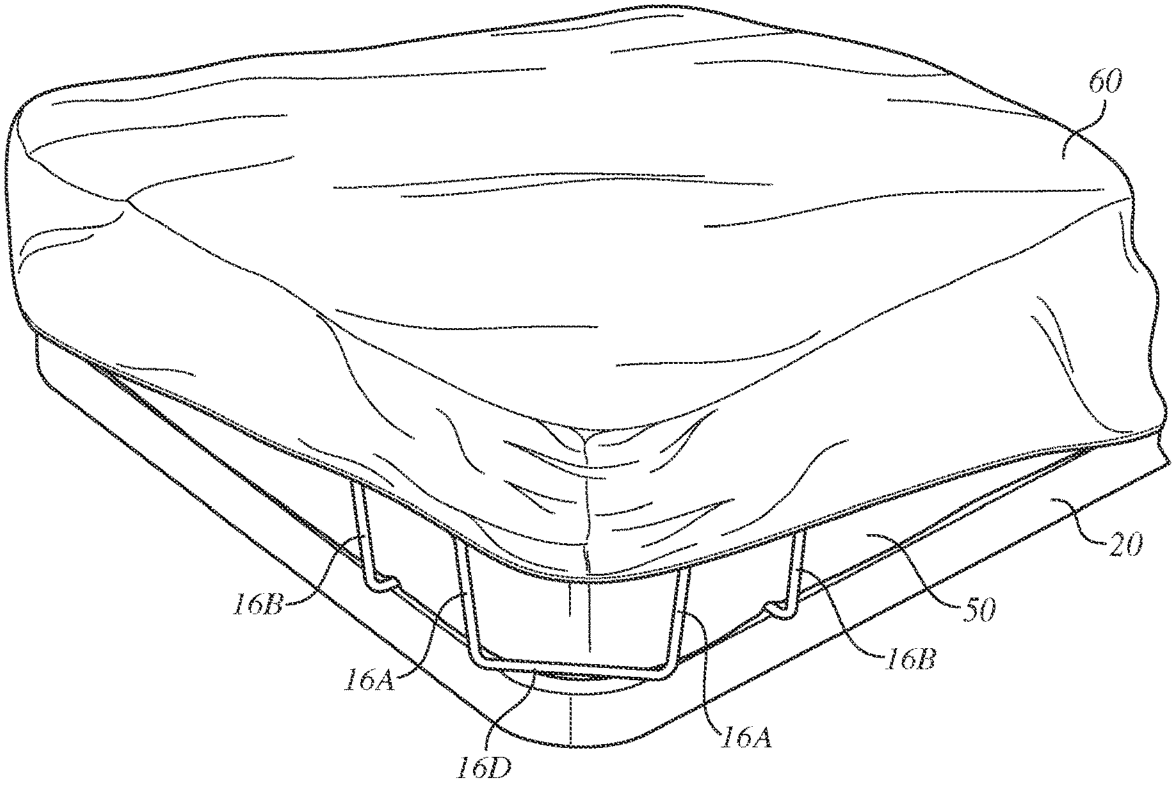

Turning to FIGS. 11-12, a single-piece embodiment of a corner retainer bracket 10 is shown that likewise has a flex segment 12, two retention segments 16 and a separation segment 18 just as the multi-piece embodiment of FIGS. 1-2 does. However, the single-piece embodiment of FIGS. 11-12 lacks the hollow sleeve 100 of the multi-piece embodiment and further its two retention segments 16 are obliquely angled instead of extending perpendicular to the flex segment 12 and the separation segment 18. As can be appreciated by FIGS. 13-14, the manner of fitting a fitted bed sheet over the corner retainer bracket 10 of FIGS. 11-12 remains substantially the same as for the multi-piece embodiment even with the need to accommodate the oblique angulation present.

Figure 15:
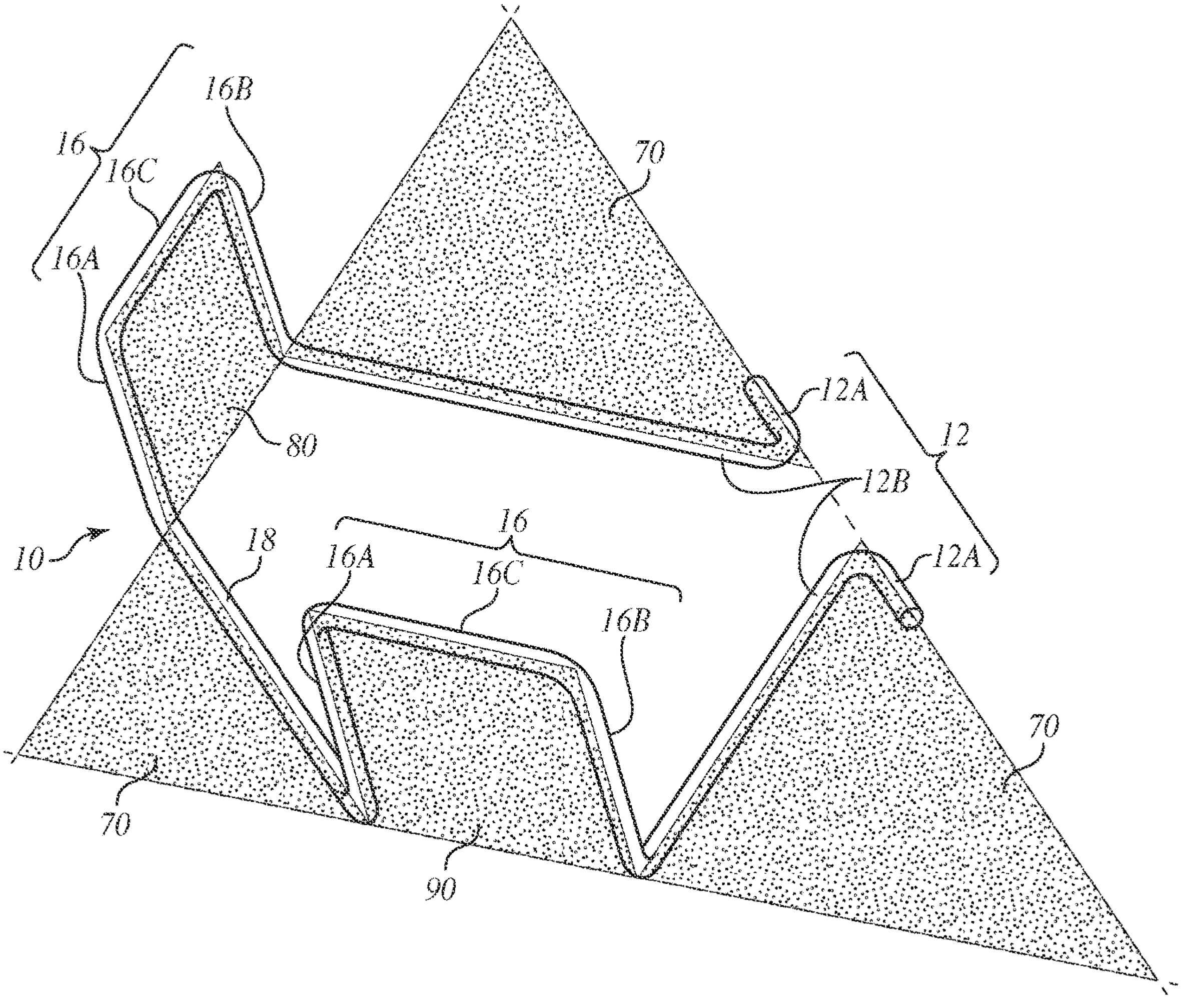
FIG. 15, which corresponds to the view of FIG. 8, except it depicts the obliquely angled, single-piece embodiment of the corner retainer bracket of FIGS. 11-14 instead of the multi-piece embodiment of FIG. 8.
Figure 16:
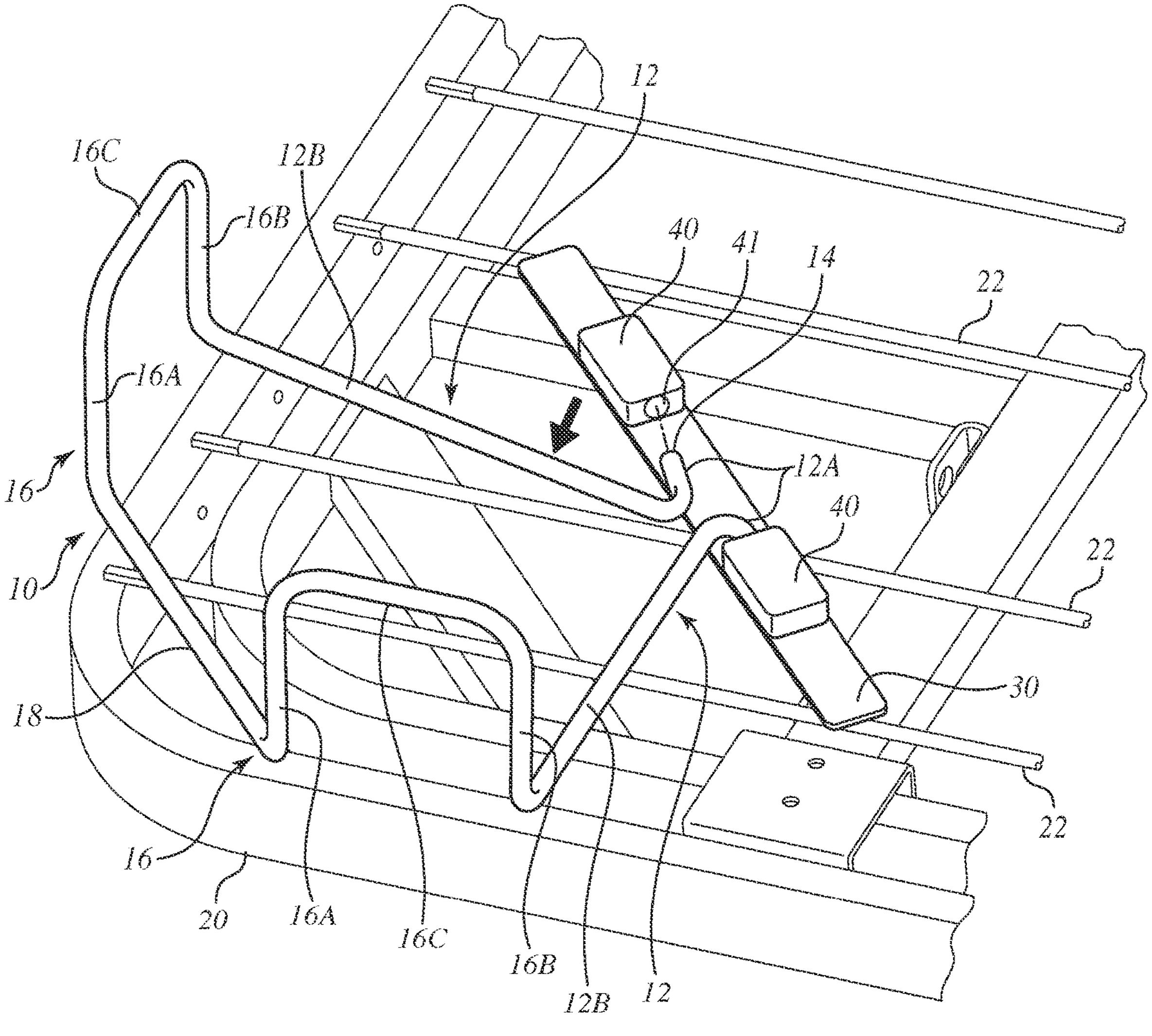
FIGS. 16-20, which correspond to the views of FIGS. 11-15, expect they depict a perpendicular angled, single-piece embodiment of the corner retainer bracket instead of the obliquely angled, single-piece embodiment.
Figure 17:
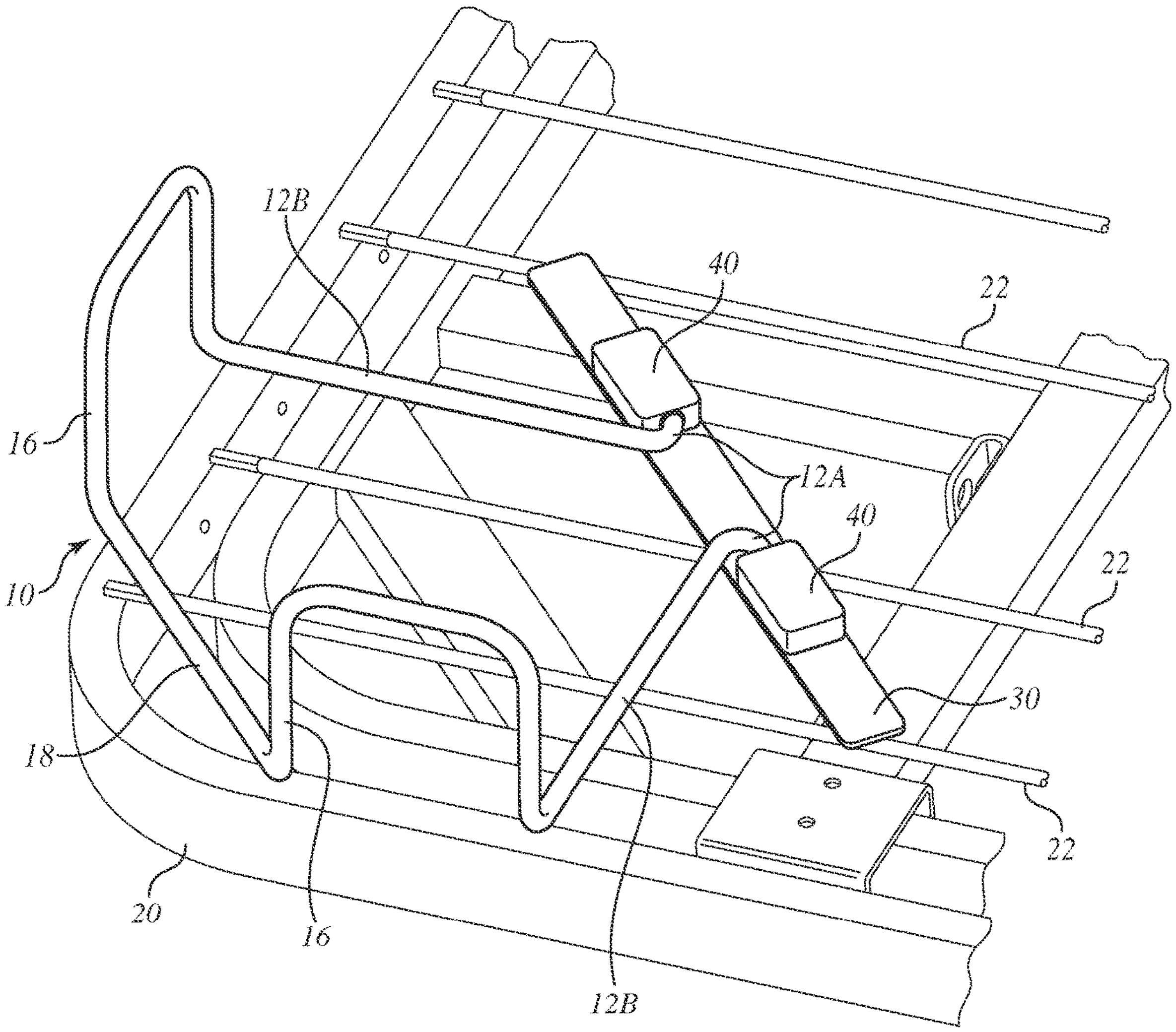
Figure 18:
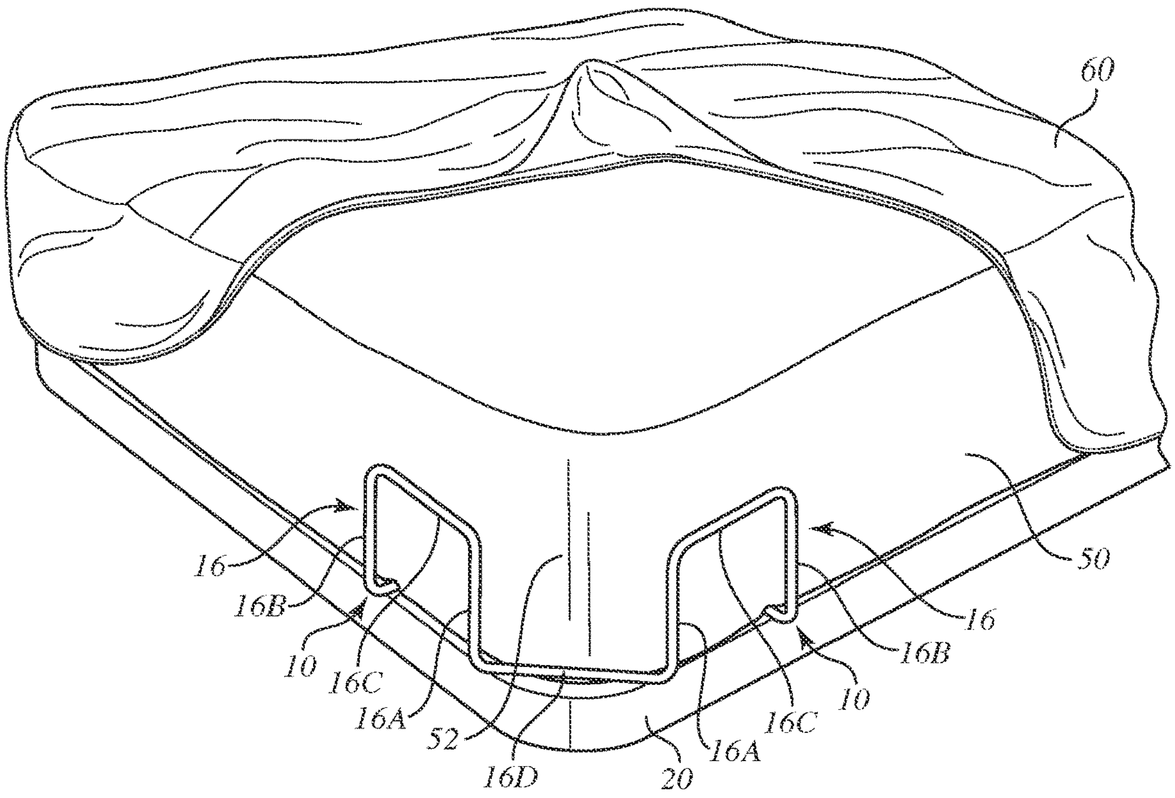
Figure 19:
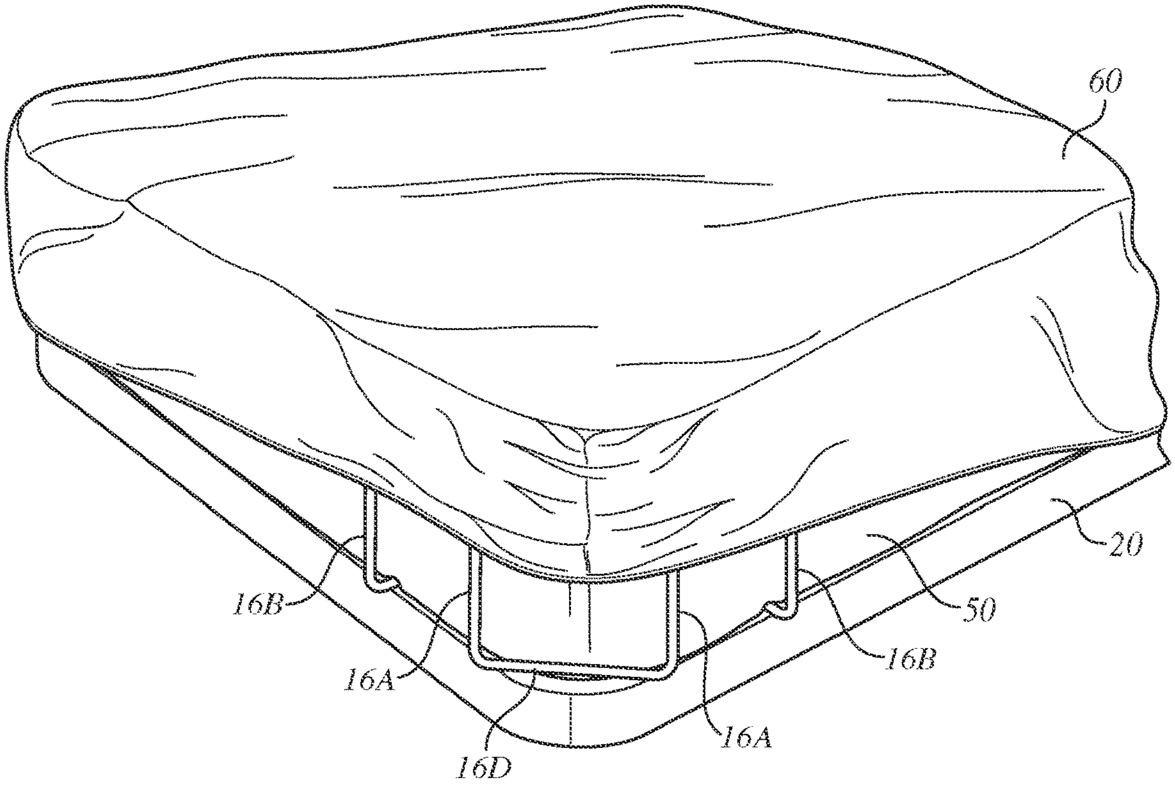
Figure 20:
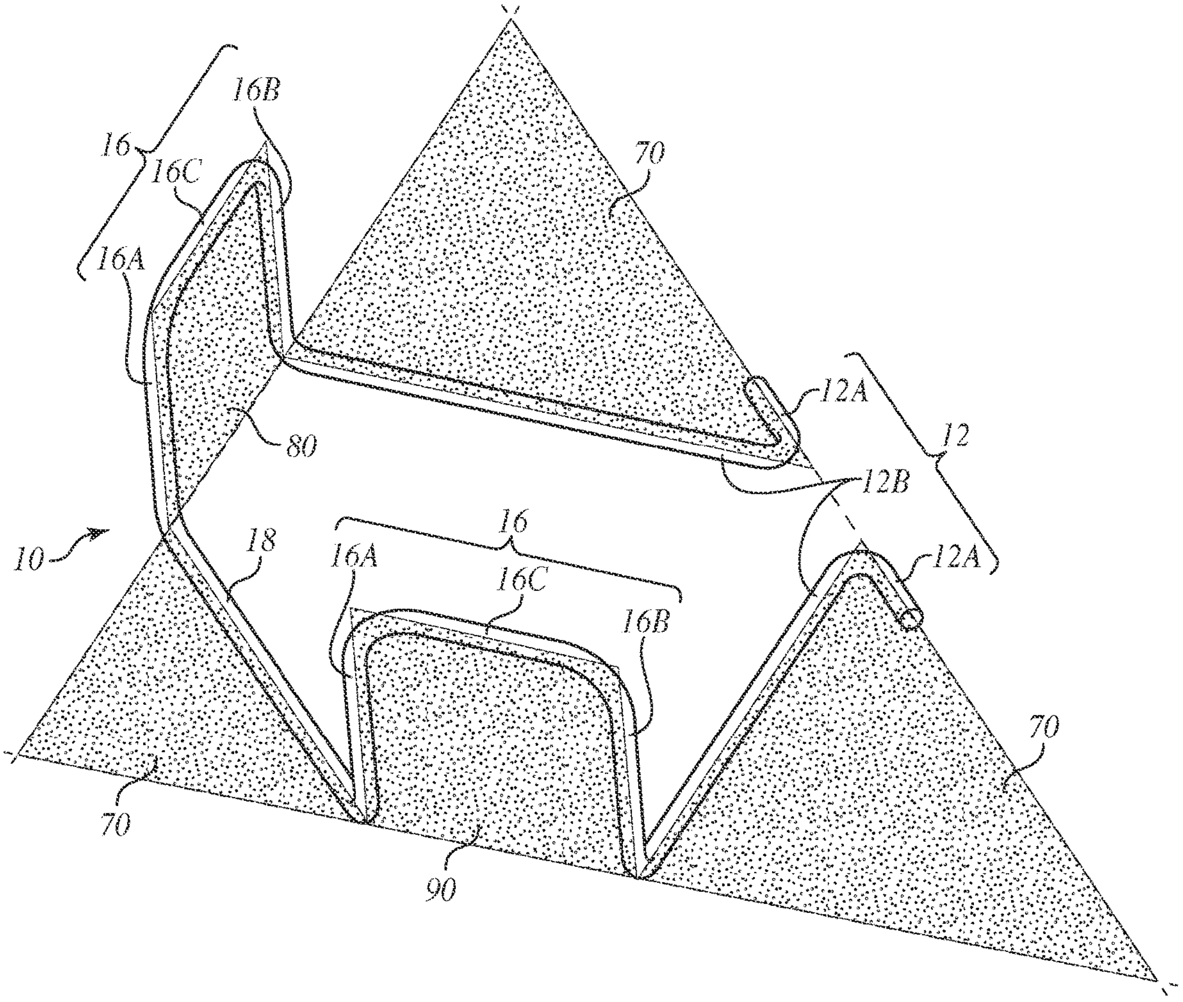

Turning to FIG. 15, the flex segment 12 and the separation segment 18 lie in a common flex plane 70. The two retention segments 16 lie in respective retention planes 80, 90. The planes 70, 80, 90 intersect each other. However, unlike the embodiment of FIGS. 1-8, the respective retention planes 80, 90 of FIG. 15 are obliquely angled, rather than perpendicular, to the common flex plane 70.

Turning to the single-piece embodiment of the corner retainer bracket 10 of FIGS. 16-20, the corner retainer bracket 10 is the same as its counterpart in FIGS. 11-15 except that the two retention segments 16 extend perpendicular to both the flex segment 12 and the separation segment 18 instead of being obliquely angled. The retention planes 80, 90 are perpendicular to the common flex plane 70.

While the foregoing description and drawings represent the preferred embodiments of the present invention, it will be understood that various changes and modifications may be made without departing from the scope of the present invention.

What is claimed is:

1. An apparatus suited to prevent a mattress from slipping off an adjustable bed frame while the mattress flexes in unison with movement from the adjustable bed frame, comprising: a mounting structure; and a mattress corner retainer bracket pivotally secured to the mounting structure, the mattress corner retainer bracket including two retention segments that each extend within respective vertical retention planes, a flex segment including a pair of bent shaped structures that terminate at two respective free ends and that extend from the two retention segments within a flex plane, the entire flex segment including the bent shaped structures extending nonparallel to each of the respective retention planes, and a separation segment that spaces apart the two retention segments from each other and that extends from each of the two retention segments, wherein the flex segment retains the mattress corner retainer bracket to the mounting structure under a spring bias of the flex segment.

2. The apparatus of claim 1, wherein the mounting structure includes a pair of mounting blocks having respective cavities, the flex segment including the pair of bent shaped structures that each possess the spring bias and that terminate at the two respective free ends, the pair of bent shaped structures being movable under manual force against the spring bias toward each other within the flex plane from an unflexed condition to a flexed condition and movable under spring bias upon release of the manual force out of the flexed condition to return to the flexed condition, the respective free ends of the pair of bent shaped structures being fitted into the respective cavities of the pair of mounting blocks.

3. The apparatus of claim 1, wherein the two retention segments each have an inverted U shape formed by two risers separated from each other by an inverted trough, the inverted trough being at a higher elevation than that of the flex segment.

4. The apparatus of claim 3, wherein the flex segment has a pair of feet and a pair of legs, the feet extending in opposite directions relative to each other and terminating at the two respective free ends, each of the legs extending between a respective one of the feet and a respective one of the two risers of each of the retention segments.

5. The apparatus of claim 4, wherein the two risers of each of the retention segments extend in a manner that is obliquely angled relative to the flex plane so that intersecting the respective retention planes with the flex plane is at oblique angles.

6. The apparatus of claim 4, wherein the two risers of respective ones of the retention segments extend parallel to each other.

7. The apparatus of claim 3, wherein the inverted trough of each of the two retention segments has a respective two parts joined together with respective sleeves.

8. The apparatus of claim 1, wherein the mounting structure includes two mounting blocks having aligned cavities with each other, the feet of the flex segments extending within the cavities in a manner that enables the flex segments to pivot at the aligned cavities.

9. The apparatus of claim 7, wherein the mounting structure includes a strip welded to rods of the adjustable bed frame, the mounting blocks being mounted to the strip.

10. The apparatus of claim 1, further comprising:

a fitted bed sheet covering a topside of a mattress and covering an outer facing side of the mattress corner retainer bracket and extending beneath an underside of a corner of a mattress.

11. The apparatus of claim 10, wherein the mattress corner retention bracket is in a pivoted position that inclines the corner of the mattress so as to define a gap between an underside of the corner of the mattress and a topside of the adjustable bed frame, the fitted bed sheet extending into the gap.

12. A method suited to prevent a mattress from slipping off an adjustable bed frame while the mattress flexes in unison with movement from the adjustable bed frame, comprising: pivotally securing a mattress corner retainer bracket to a mounting structure, the mattress corner retainer bracket being configured by extending two retention segments each within respective vertical retention planes, terminating a flex segment at two respective free ends and extending same from the two retention segments within a flex plane, the entire flex segment including bent L-shaped structures extending nonparallel to each of the respective retention planes, and spacing apart the two retention segments from each other with a separation segment extends from each of the two retention segments, and retaining the mattress corner retainer bracket to the mounting structure under a spring bias of the flex segment.

13. The method of claim 12, further comprising:

covering a topside of a mattress and an outer facing side of the mattress corner retainer bracket with a fitted bed sheet and extending the bed sheet beneath an underside of a corner of a mattress.

14. The method of claim 12, further comprising:

pivoting the mattress corner retention bracket into a pivoted position that inclines the corner of the mattress so as to define a gap between an underside of the corner of the mattress and a topside of the adjustable bed frame, the fitted bed sheet extending into the gap.

15. The method of claim 12, wherein the two retention segments each have an inverted U shape formed by two risers separated from each other by an inverted trough, the inverted trough having two parts; further comprising:

joining together the two parts of the inverted trough of each of the two retention segments with respective sleeves; and arranging the inverted trough of each of the two retention segments to be at a higher elevation than that of the flex segment.

* * * * *